Patented Feb. 23, 1932

1,846,546

UNITED STATES PATENT OFFICE

GUILLAUME DE MONTMOLLIN, HANS GUBLER, AND JOSEPH SPIELER, OF BASEL, SWITZERLAND, ASSIGNORS TO SOCIETY OF CHEMICAL INDUSTRY IN BASLE, OF BASEL, SWITZERLAND

AZO-DYESTUFFS AND PROCESS OF MAKING SAME

No Drawing. Application filed June 27, 1927, Serial No. 201,955, and in Switzerland July 10, 1926.

The present invention relates to the manufacture of new azo-dyestuffs. It comprises the process of making these dyestuffs, the dyestuffs themselves, and the material dyed with the new dyestuffs.

According to this invention new dyestuffs of the general formula

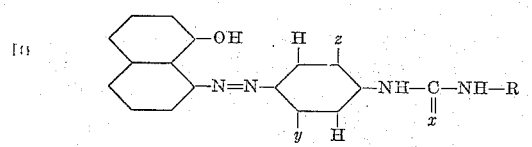

wherein the naphthalene nucleus contains at least one sulfo group and no further substituents, and in which $y$ and $z$ stand for hydrogen, alkyl or alkoxy, $x$ stands for O or S, and R represents a compound containing at least two aromatic nuclei of the benzene or the naphthalene series united by at least one azo-chromophore, are obtained by uniting by means of compounds of the general formula $y'=C=x$, wherein $x$ stands for O or S and $y'$ stands for S or $Cl_2$, two molecular proportions of aminoazo-dyestuffs of which at least one corresponds to the general formula

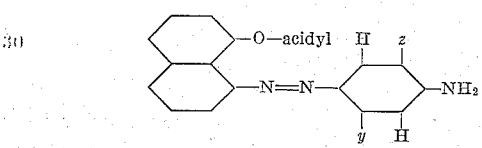

wherein the naphthalene nucelus contains at least one sulfo group and no further substituents, and in which $y$ and $z$ stand for hydrogen, alkyl or alkoxy, and the other contains at least one azo-chromophore, whereupon the new products thus obtained are treated with saponifying agents.

The same dyestuffs may also be obtained by replacing the aminoazo-dyestuff of the general formula

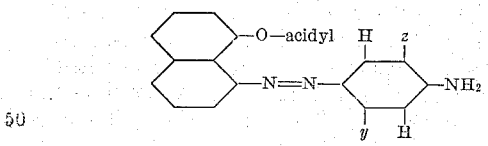

by an aminoazo-dyestuff of the general formula

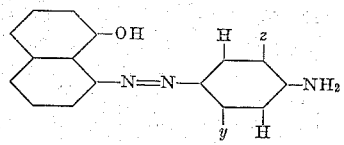

wherein the naphthalene nucleus contains also at least one sulfo group and no other substituents, $y$ and $z$ having the above mentioned signification.

The dyestuffs may also be obtained by uniting by means of the above mentioned connecting links the dyestuffs of the above explained general formulas.

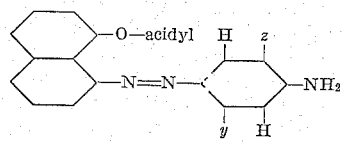

or

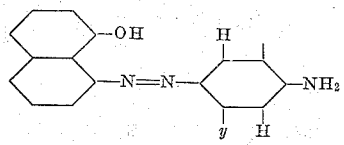

with a product, such as an aminonaphthol or a diamine, which product, after uniting with the dye stuff, can further be transformed, either by diazotizing and coupling, or by coupling with suitable compounds, into azo-dyestuffs.

It is further possible to obtain metal containing dyestuff by treating the products of the present invention in a suitable phase of their preparation with agents yielding metals, such as salts, oxides or hydroxides of copper. That is for instance the case if the dyestuffs contain the residues of the salicylic acid or if they have been prepared by means of diazotized ortho-aminophenols or diazotized ortho-aminocarboxylic acid.

The new dyestuffs are dark powders which dissolve in water to orange, red, brown and violet solutions. They dye, without a mordant, vegetable fibre orange, red, brown and violet tints which can equalize well, are very fast to light, and can be discharged.

The following examples illustrate the invention, the parts being by weight:—

Example 1

There is made in known manner a monoazo-dyestuff by diazotizing 23.7 parts of para-toluenesulfonic acid ester of 1:8-aminonaphthol-3:6-disulfonic acid and coupling the diazo-compound with 6.9 parts of cresidine; the dyestuff is dissolved in 300 parts of water, the solution is made alkaline with sodium carbonate and phosgene is passed through it until no free aminoazo-dyestuff can be detected. The urea thus formed is separated by salting out and filtration. The para-toluenesulfonic acid residue is split off by a short heating at 90° C. in the presence of a solution of sodium hydroxide of 5 per cent. strength. On cooling, the new dyestuff crystallizes. After filtering and drying there is obtained a red-brown powder, which dissolves in water to a bluish-red solution. By treating with reducing agents, such as stannous chloride and hydrochloric acid, there are obtained 1:8-aminonaphthol-3:6-disulfonic acid and the 4:4'-diamino-2:2'-dimethoxy-5:5'-dimethyldiphenylurea. It dyes cotton without a mordant very equal blue-red tints of excellent fastness to light. The dyeings are easily discharged. It corresponds to the following formula

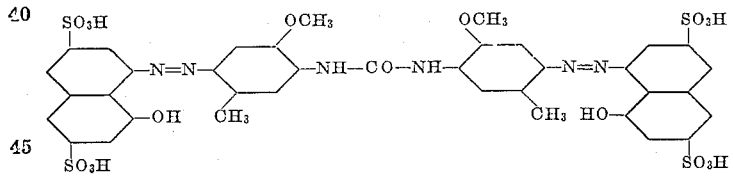

The same product is formed by the action of phosgene on the product made by coupling diazotized 1:8-aminonaphthol-3:6-disulfonic acid with cresidine.

The corresponding dyestuff derived from thiophosgene dyes cotton more bluish tints. It can be prepared as follows: 50 parts of the monoazo-dyestuff made from diazotized para-toluenesulfonic acid ester of 1:8-aminonaphthol-3:6-disulfonic acid and cresidine are introduced into a mixture consisting of 20 parts of caustic potash, 320 parts of alcohol and 50 parts of carbon bisulfide, and are boiled for a long time in an apparatus provided with a reflux condenser. After cooling the dyestuff is filtered, saponified by a short heating in the presence of a dilute solution of sodium hydroxide, and isolated by salting out. It corresponds to the following formula:

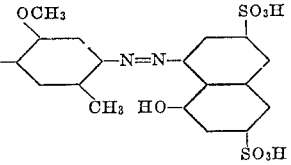

Other products also dyeing red are obtained when there are substituted for the 1:8-aminonaphthol-3:6-disulfonic acid other 1:8-aminonaphthols, for instance 1:8-aminonaphthol-4-sulfonic acid and 1:8-aminonaphthol 4:6-disulfonic acid. The substitution of other amines, such as ethoxycresidine of the formula

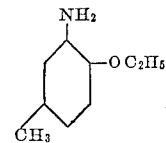

or para-xylidine for the cresidine leads also to bluish-red dyeing products, meta-toluidine leads to a more brown-red dyeing product.

Example 2

62.1 parts of the monoazo-dyestuff made from diazotized para-toluenesulfonic acid ester of 1:8-amino-naphthol-3:6-disulfonic acid and cresidine are dissolved in 1200 parts of water together with 43.8 parts of the saponified dyestuff from 1 molecule of diazotized mono-acetyl-para-phenylenediamine-sulfonic acid and 1 molecule of 2:8-aminonaphthol-6-sulfonic acid (coupled in acid solution) and after addition of 50 parts of calcined sodium carbonate the solution is treated with phosgene until the diazotizability of the mass has practically disappeared. By salting out there is obtained a dyestuff which dyes cotton red, fast to light. By heating the dyestuff to 75–95° C. in presence of caustic soda solution of 3 per cent. strength the toluenesulfonic acid ester group is split off. There is obtained a dyestuff which dyes cotton blue-red of pronounced fastness to light. The same dyestuff is produced if for the product of coupling diazotized para-toluenesulfonic acid ester of 1:8-aminonaphthol-3:6-disulfonic acid with cresidine is substituted the product of coupling diazotized 1:8-aminonaphthol-3:6-disulfonic acid with cresidine, whereby splitting off of the para-toluenesulfonic acid residue does not arise. The new dyestuff corresponds to the following formula.

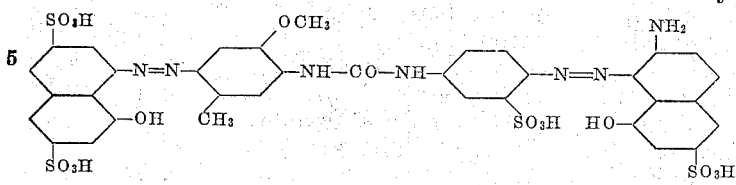

Other red dyeing dyestuffs may be made by substituting for the saponified dyestuff from diazotized mono-acetyl-para-phenylenediaminesulfonic acid and 2:8-aminonaphthol-6-sulfonic acid for instance the dyestuff from diazobenzene or diazoazobenzene and 2:5-aminonaphthol-7-sulfonic acid (coupled in alkaline solution).

A violet dyeing dyestuff is obtained by uniting the dyestuff made from 1:8-aminonaphthol-3:6-disulfonic acid and cresidine by means of phosgene with the trisazo-dyestuff which is obtained by coupling diazotized 2-naphthylamine-4:8-disulfonic acid with α-naphthylamine, by further diazotizing and coupling with 1-naphthylamine-6-sulfonic acid, and finally by diazotizing once more and coupling with the 2:5-aminonaphthol-7-sulfonic acid. The same dyestuff is also obtained by uniting the dyestuff made from 1:8-aminonaphthol-3:6-disulfonic acid and cresidine with 2:5-aminonaphthol-7-sulfonic acid by means of phosgene and thereafter by combining the mixed urea thus obtained with one molecule of the diazotized disazodyestuff made from 2-naphthylamine-4:8-disulfonic acid, α-naphthylamine and 1-naphthylamine-6-sulfonic acid. It corresponds to the following formula:

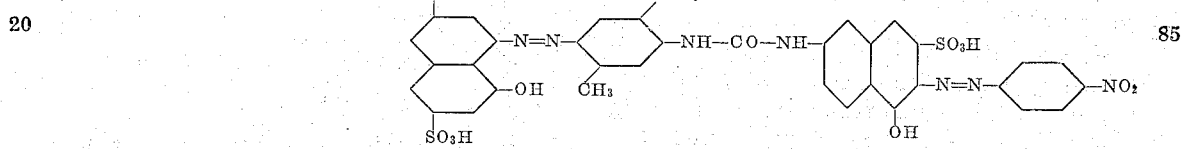

Dyestuffs of this type may also be produced on the fibre. For instance cotton may be dyed by the intermediate dyestuff which can be obtained by uniting one molecule of the dyestuff made from 1:8-aminonaphthol-3:6-disulfonic acid and cresidine with one molecule of 2:5-aminonaphthol-7-sulfonic acid by means of phosgene, and developed by after-treatment with diazobenzene or diaz-para-nitrobenzene. The dyestuff developed with diazo-para-nitrobenzene corresponds to the formula:

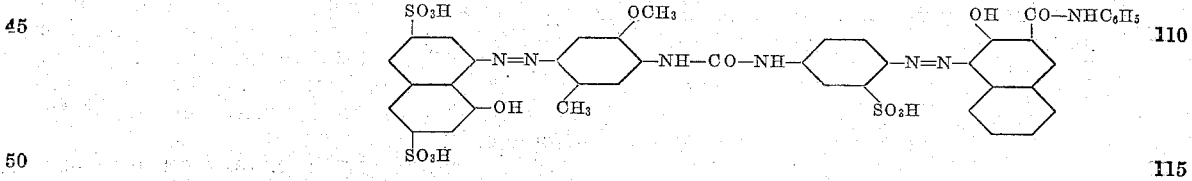

However, by uniting the dyestuff made from 1:8-amino-naphthol-3:6-disulfonic acid and cresidine with one molecule of chloro-meta-phenylenediamine or para- or metaphenylenediaminesulfonic acid by means of phosgene, dyestuffs are obtained which are further diazotized in substance or on the fibre and coupled with β-naphthol, β-hydroxynaphthoic acid or with the arylides of the β-hydroxynapthoic acid, yielding red to red-brown dyestuffs. For instance the dyestuff made from 1:8-aminonaphthol-3:6-disulfonic acid and cresidine with one molecule of para-phenylenediaminesulfonic acid by means of phosgene, which dyestuff is further diazotized in substance or on the fibre and coupled with the anilide of the β-hydroxynaphthoic acid has the following formula:

*Example 3*

62.1 parts of the monoazo-dyestuff from diazotized para-toluenesulfonic acid ester of 1:8-aminonaphthol-3:6-disulfonic acid and cresidine and 25.7 parts of the reduced azo-

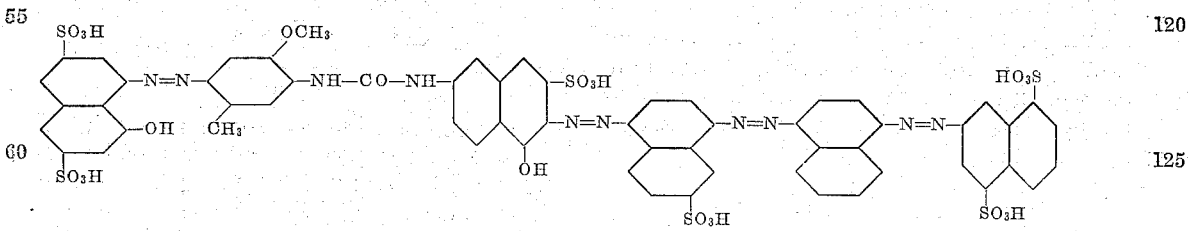

dyestuff from diazotized para-nitraniline and salicylic acid are treated with phosgene in the manner described in the preceding examples and then with alkali. There is obtained before the splitting off of the para-toluenesulfonic acid residue an orange-dyeing dyestuff, and after the splitting off of the said residue an orange-red-dyeing dyestuff fast to light. It corresponds to the following formula:

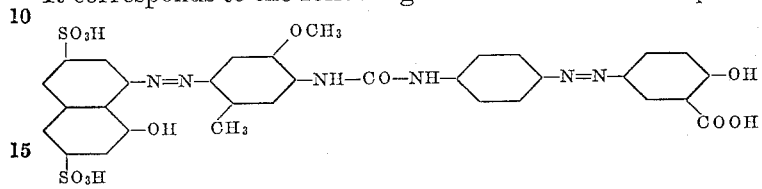

Both these dyestuffs have enhanced fastness to light when they are converted into copper compounds.

Further orange-dyeing dyestuffs are obtained by substituting for the reduction product of the dyestuff from diazotized para-nitraniline and salicylic acid aminoazobenzene or the product of coupling a diazotized aminosulfonic acid of the benzene or naphthalene series, such as sulfanilic acid, a chloranilinesulfonic acid, a toluidinesulfonic acid, an aminophenolethersulfonic acid, α- or β-napthylamine, or a mono- or disulfonic acid thereof, such as 1:4-naphthylaminesulfonic acid, 1-naphthylamine-2:4- or 3:8- or 4:8-disulfonic acid, 2-naphthylamine-4:8-disulfonic acid etc., with an amine, such as cresidine, xylidine, ortho-toluidine, meta-toluidine, or aniline etc.

Dyestuffs containing copper may be obtained as follows:

One molecule of the dyestuff made from diazotized 1:8-aminonaphthol-3:6-disulfonic acid and cresidine is united with one molecule of the dyestuff obtained from diazotized ortho-aminophenolsulfonic acid of the formula

and 2:5-aminonaphthol-7-sulfonic acid by means of phosgene. The dyestuff thus obtained is treated with copper oxide ammonia or copper sulfate, and the new copper compound is isolated in known manner. It dyes cotton red tints.

*Example 4*

A dye-bath is prepared with 2 per cent. of the dyestuff described in the first paragraph of Example 1 and 2 per cent. of sodium carbonate; cotton goods are introduced at 60° C. and the bath is heated to boiling; after a quarter of an hour 30 per cent. of Glauber salt are added and the boiling is continued for a further half-an-hour. The cotton is thereby dyed blue-red fast to light.

What we claim is:

1. A process for the manufacture of azo-dyestuffs of the general formula

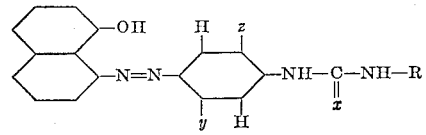

wherein the naphthalene nucleus contains at least one sulfo group and no further substituents, $y$ and $z$ stand for hydrogen, alkyl or alkoxy, $x$ stands for O or S, and R represents a compound containing at least two aromatic nuclei of the benzene or naphthalene series united by at least one azo-chromophore, by uniting, by means of compounds of the general formula $y'=C=x$ wherein $x$ stands for O or S, and $y'$ stands for S or $Cl_2$, two molecular proportions of aminoazo-dyestuffs, of which at least one corresponds to the general formula

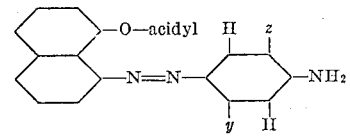

wherein the naphthalene nucleus contains at least one sulfo group and no further substituents, $y$ and $z$ stand for hydrogen, alkyl or alkoxy, and the other contains at least one azo-chromophore, whereupon the new products thus obtained are treated with saponifying agents.

2. A process for the manufacture of azo-dyestuffs corresponding to the general formula

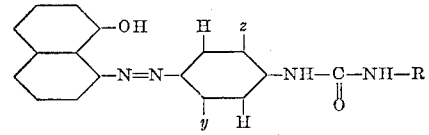

wherein the naphthalene nucleus contains at least one sulfo group and no further substituents, $y$ and $z$ stand for hydrogen, alkyl or alkoxy, and R represents a compound containing at least two aromatic nuclei of the benzene or naphthalene series united by at least one azo-chromophore, by uniting, by means of phosgene, two molecular proportions of aminoazo-dyestuffs, of which at least one corresponds to the general formula

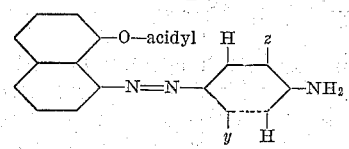

wherein the naphthalene nucleus contains at least one sulfo group and no further substituents, and $y$ and $z$ stand for hydrogen, alkyl or alkoxy, and the other contains at least one azo-chromophore, whereupon the new products thus obtained are treated with saponifying agents.

3. A process for the manufacture of azo-dyestuffs corresponding to the general formula:

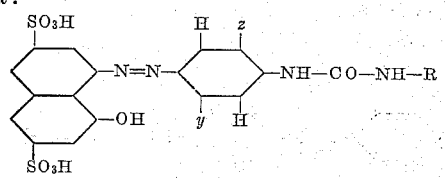

wherein $y$ and $z$ stand for hydrogen, alkyl or alkoxy, and R represents a compound containing at least two aromatic nuclei of the benzene or naphthalene series united by at least one azo-chromophore, by uniting two molecular proportions of aminoazo-dyestuffs,

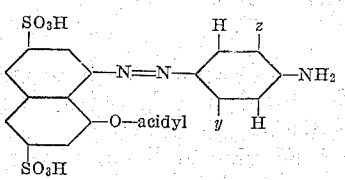

of which at least one corresponds to the general formula

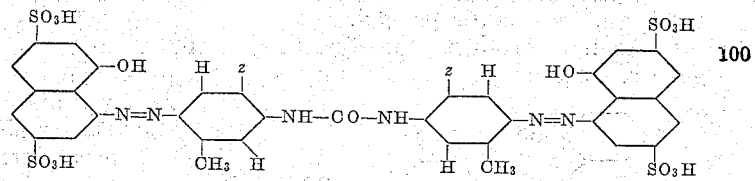

wherein $y$ and $z$ stand for hydrogen, alkyl or alkoxy, and the other contains at least one azo-chromophore, by means of phosgene, whereupon the new products thus obtained are treated with saponifying agents.

4. A process for the manufacture of azo-dyestuffs of the general formula:

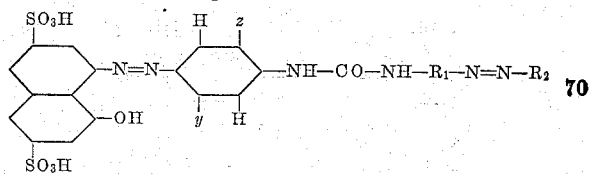

wherein $y$ and $z$ stand for hydrogen, alkyl or alkoxy, and $R_1$ and $R_2$ represent aromatic nuclei of which one belongs to the benzene series and the other to the naphthalene series, by uniting, by means of phosgene, two aminoazo-dyestuffs, of which one corresponds to the formula

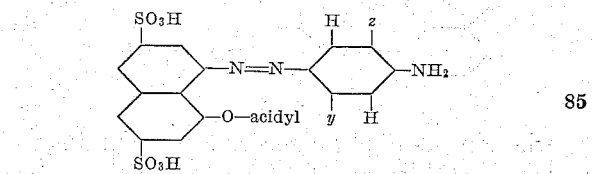

wherein $y$ and $z$ stand for hydrogen, alkyl or alkoxy, and the other corresponds to the general formula $NH_2-R_1-N=N-R_2$, wherein $R_1$ and $R_2$ have the above given signification, whereupon the new products thus obtained are treated with saponifying agents.

5. A process for the manufacture of azo-dyestuffs corresponding to the general formula:

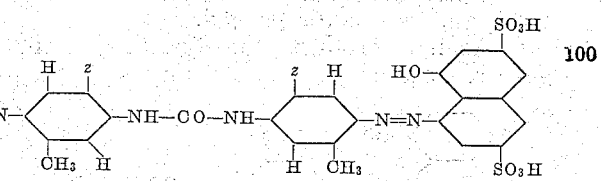

wherein $z$ stands for hydrogen, alkyl or alkoxy, by uniting, by means of phosgene, two molecular proportions of the dyestuffs corresponding to the general formula

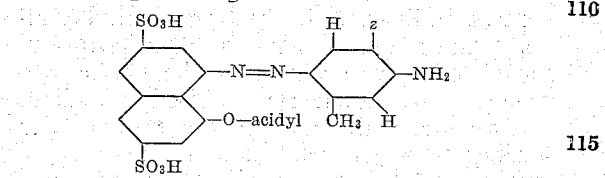

wherein $z$ stands for hydrogen, alkyl or alkoxy, whereupon the new products thus obtained are treated with saponifying agents.

6. A process for the manufacture of an azo-dyestuff corresponding to the formula

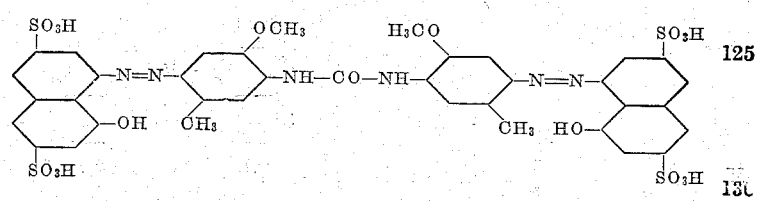

by uniting two molecules of the dyestuff corresponding to the formula

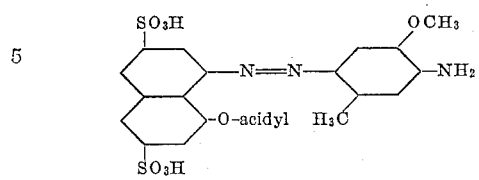

by means of phosgene, whereupon the new product thus obtained is treated with saponifying agents.

7. As new products the dyestuffs corresponding to the general formula

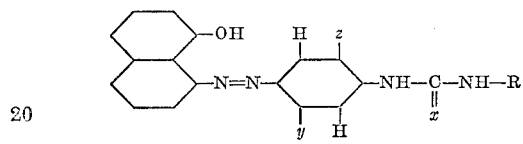

wherein the naphthalene nucleus contains at least one sulfo group and no further substituents, $y$ and $z$ stand for hydrogen, alkyl or alkoxy, $x$ stands for O or S, and R represents a compound containing at least two aromatic nuclei of the benzene or naphthalene series united by at least one azo-chromophore, which products form dark powders which dissolve in water to orange, red, brown and violet solutions, and dye, without a mordant, vegetable fibre orange, red, brown and violet tints which can equalize well, are very fast to light, and can be discharged.

8. As new products the dyestuffs of the general formula

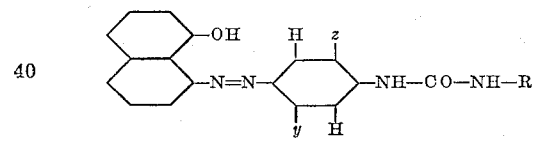

wherein the naphthalene nucleus contains at least one sulfo group and no further substituents, $y$ and $z$ stand for hydrogen, alkyl or alkoxy, and R represents a compound containing at least two aromatic nuclei of the benzene or naphthalene series united by at least one azochromophore, which products form dark powders which dissolve in water to orange, red, brown and violet solutions, and dye, without a mordant, vegetable fibre orange, red, brown and violet tints which can equalize well, are very fast to light, and can be discharged.

9. As new products the dyestuffs of the general formula

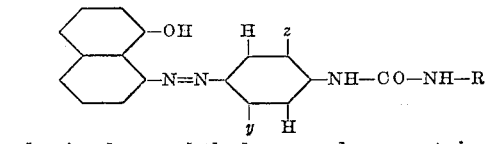

wherin the naphthalene nucleus contains two sulfo groups and no further substituents, $y$ and $z$ stand for hydrogen, alkyl or alkoxy, and R represents a compound containing at least two aromatic nuclei of the benzene or naphthalene series united by at least one azo-chromophore, which products form dark powders which dissolve in water to orange, red, brown and violet solutions, and dye, without a mordant, vegetable fibre orange, red, brown and violet tints which can equalize well, are very fast to light, and can be discharged.

10. As new products the dyestuffs of the general formula

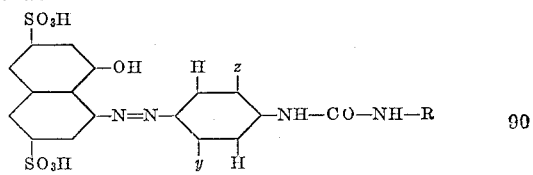

wherein $y$ and $z$ stand for hydrogen, alkyl or alkoxy, and R represents a compound containing at least two aromatic nuclei of the benzene or naphthalene series united by at least one azo-chromophore, which products form dark powders which dissolve in water to orange, red, brown and violet solutions, and dye, without a mordant, vegetable fibre orange, red, brown and violet tints which can equalize well, are very fast to light and can be discharged.

11. As new products the dyestuffs of the general formula

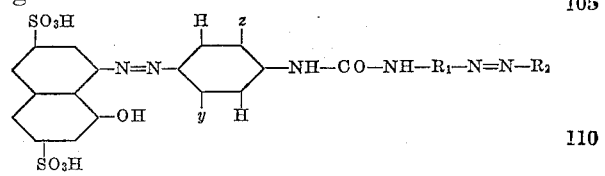

wherein $y$ and $z$ stand for hydrogen, alkyl or alkoxy, and $R_1$ and $R_2$ represent aromatic nuclei of which one belongs to the benzene series, and the other to the naphthalene series, which products form dark powders which dissolve in water to orange, red and brown solutions, and dye, without a mordant, vegetable fibre orange, red and brown tints which can equalize well, are very fast to light and can be discharged.

12. As new products the dyestuffs of the general formula

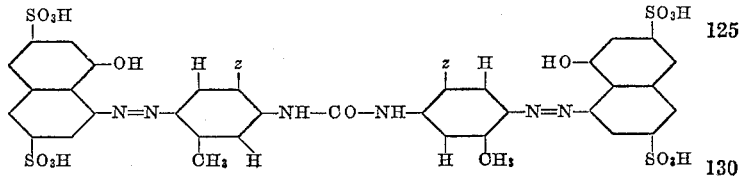

wherein z stands for hydrogen, alkyl or alkoxy which products form dark powders, dissolving in water to solutions varying from red-brown to bluish-red color, dyeing cotton, without a mordant, the same tints which are of excellent fastness to light, equalize very well, can be easily discharged, and which products, on being treated with reducing agents, such as stannous chloride and hydrochloric acid, split into 4:4'-diaminodiphenylurea compounds and 1:8-aminonaphthol-3:6-disulfonic acid.

13. As a new product the dyestuff of the general formula:

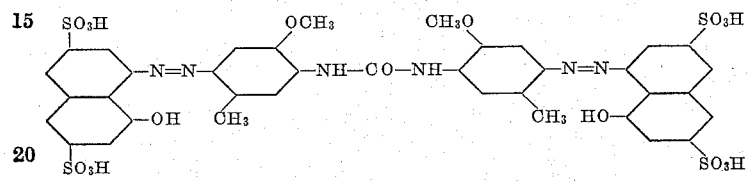

which forms a red-brown powder, dissolving in water to a bluish-red solution, dyeing cotton, without a mordant, very equal blue-red tints of excellent fastness to light, which can be easily discharged, and which product, on being treated with reducing agents, such as stannous chloride and hydrochloric acid, splits into the 4:4'-diamino-2:2'-dimethoxy-5:5'-dimethyldiphenylurea and the 1:8-aminonaphthol-3:6-disulfonic acid.

In witness whereof we have hereunto signed our names this 15th day of June, 1927.

GUILLAUME DE MONTMOLLIN.
HANS GUBLER.
JOSEPH SPIELER.